United States Patent [19]
Wada et al.

[11] Patent Number: 5,270,995
[45] Date of Patent: Dec. 14, 1993

[54] METHOD FOR RECORDING AND REPRODUCING INFORMATION BY VARYING A WORK FUNCTION OF A RECORDING MEDIUM AND DEVICE FOR THE SAME

[75] Inventors: Katsuo Wada, Yao; Etsuji Minami; Kenji Ohta, both of Nara, all of Japan

[73] Assignee: Sharp Kabushiki Kaisha, Osaka, Japan

[21] Appl. No.: 24,814

[22] Filed: Mar. 1, 1993

Related U.S. Application Data

[63] Continuation of Ser. No. 883,924, May 12, 1992, abandoned, which is a continuation of Ser. No. 463,321, Jan. 10, 1990, abandoned.

[30] Foreign Application Priority Data

Jan. 13, 1989 [JP] Japan ............................. 1-7106

[51] Int. Cl.$^5$ ................................. G11B 7/00
[52] U.S. Cl. .................... 369/101; 369/121; 369/275.2
[58] Field of Search ............... 365/110, 111, 112, 113, 365/114, 106, 118, 128; 369/101, 100, 126, 275.1, 275.2, 275.5, 121, 122

[56] References Cited

U.S. PATENT DOCUMENTS

| | | | |
|---|---|---|---|
| 3,760,383 | 9/1973 | Wolfe et al. | 365/128 |
| 4,085,455 | 4/1978 | Okumura | 365/118 |
| 4,090,253 | 5/1978 | Salgo | 365/118 |
| 4,159,443 | 6/1979 | Stocker et al. | 365/110 |
| 4,575,822 | 3/1986 | Quate | 365/114 |
| 4,785,437 | 11/1988 | Dransfeld . | |
| 4,826,732 | 5/1989 | Kazan et al. | 365/118 |
| 4,829,507 | 5/1989 | Kazan et al. | 365/118 |
| 4,888,758 | 12/1989 | Scruggs et al. . | |
| 4,916,688 | 4/1990 | Foster et al. | 365/113 |

FOREIGN PATENT DOCUMENTS

| | | |
|---|---|---|
| 0186813 | 3/1989 | European Pat. Off. . |
| 3724617 | 1/1988 | Fed. Rep. of Germany . |
| 58-105441 | 6/1983 | Japan . |
| 58-222453 | 12/1983 | Japan . |
| 63-234430 | 9/1988 | Japan . |

OTHER PUBLICATIONS

Publication entitled "High Capacity Memories Using Short-Wavelength or Electron Beam Irradiation of the Storage Medium", J. S. Courtney-Pratt; Western Electric Technical Digest, Sep. 1984.
59-221846 English Abstract of Japanese Document.
60-117434 English Abstract of Japanese Document.
59-221847 English Abstract of Japanese Document.

*Primary Examiner*—Donald E. McElheny, Jr.

[57] ABSTRACT

A method and a device for recording and reproducing information utilizing a work function variation of a recording medium, the recording medium being made of a material whose work function can vary according to a structural change thereof caused by the irradiation of an electromagnetic wave or electron beam.

14 Claims, 3 Drawing Sheets

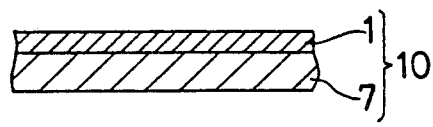
FIG. 9
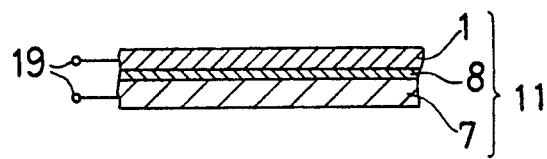
FIG. 10
FIG. 11
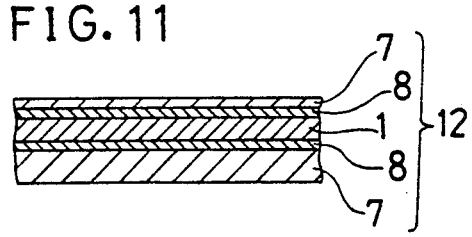
FIG. 12
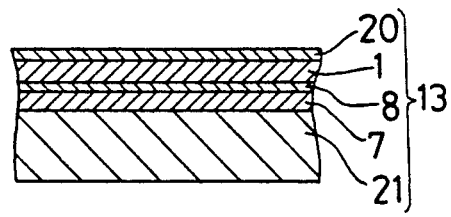
FIG. 13 (a)
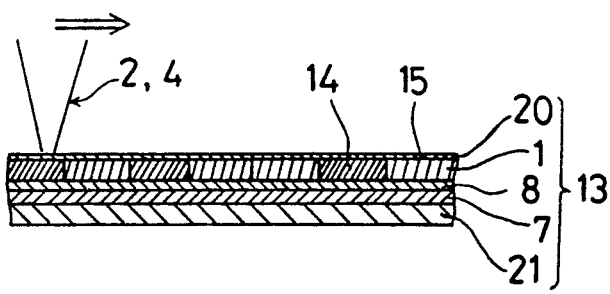
FIG. 13 (b)
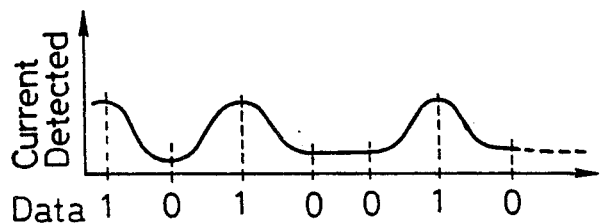

METHOD FOR RECORDING AND REPRODUCING INFORMATION BY VARYING A WORK FUNCTION OF A RECORDING MEDIUM AND DEVICE FOR THE SAME

This application is a continuation of application Ser. No. 07/883,924 filed on May 12, 1992, now abandoned, which is a continuation of Ser. No. 07/463,321, filed on Jan. 10, 1990, now abandoned.

BACKGROUND OF THE INVENTION

1. Field of the Invention

The present invention relates to a method and device for recording and reproducing information utilizing a work function variation of a recording medium to record information, and a photoelectric or thermoelectric effect to reproduce information, and the

2. Description of the Prior Art

Several conventional methods have been used for recording and reproducing information:

one method for magnetically recording and reproducing information calls for having portions being locally magnetized in a predetermined direction on a magnetic recording medium formed by means of a magnetic head to record information, the information is then reproduced by detecting an arrangement pattern in the magnetized direction using of the magnetic head.

another method for optically recording and reproducing information uses a pit pattern having microscopic unevenness formed on the surface of a recording medium to record information, The information is reproduced by applying a light beam onto the surface of the recording medium and detecting the pit pattern based on the intensity of the reflected light.

yet another method for magneto-optically recording and reproducing information uses heat generated by applying a light beam onto a magneto-optic recording medium to which a magnetic field is being applied, which functions to locally lower coercivity of the medium whereby portions being magnetized in a predetermined direction are formed on the basis of the magnetic field to record information, The information is reproduced by applying a light beam onto the magneto-optic recording medium and then detecting the arrangement pattern in the magnetized direction on the basis of the difference in the angle of the oscillating axis, for example, Kerr effect of the reflected light.

Unfortunately, many drawbacks are associated with using the conventional methods mentioned above. The method for magneto-optically recording and reproducing information, for example, requires a specific magnetic material having a low coercivity and a high residual magnetic flux density and at the same time a low thermal conductivity for the magneto-optic recording medium. Accordingly, a shortcoming exists in that materials suitable for the recording medium are considerably limited. Further, when information is reproduced, the magnetic method requires a magnetism to electric current conversion, the optical method requires a light to electric current conversion, and the magneto-optical method requires a light to electric current conversion. Therefore, processing of regenerative signals becomes complicated thereby suffering from noise influence.

There is another known recording method in which a particle beam is irradiated onto a recording medium to implant or stick the particle (element) thereof to the recording medium for generating a composition change thereof, whereby recording can be performed (refer to Japanese Unexamined Patent Application No. SHO 58(1983)-222453).

However, in order to erase information recorded by utilizing the composition change in such a method, it is necessary to etch the surface of the recording medium by applying an electron, ion, or neutral particle beam thereto, to sputter-etch the overall surface thereof for restoring the original composition state, or to heat the recording medium to evaporate the particle stuck to surface thereof or to diffuse it. This method has a in that the recording medium will deteriorate by repeatedly performing the recording-erasing process.

SUMMARY OF THE INVENTION

An object of the invention is to provide a method for recording and reproducing information without the problems associated with conventional methods.

Thus, according to the invention, there is provided a method for recording and reproducing information comprising the steps of irradiating an electromagnetic wave or an electron beam onto a recording medium, the recording medium being made of a material whose work function can vary according to a structural change thereof caused by the irradiation of the electromagnetic wave or electron beam, to locally vary the work function of the medium thereby recording information on the basis of a distribution pattern of the work function varied portion, and reproducing the information by detecting the distribution pattern on the basis of a difference in photoelectric or thermoelectric effect between the work function varied portion and a work function non-varied portion of the medium.

According to the method for recording and reproducing information of the invention, the recording medium does not require specific magnetic or optic properties which have been indispensable in a conventional method whereby selection of a material for the medium can be made from a larger group of acceptable alternatives so that it becomes possible to improve the productivity and lower the production cost of an information recording and reproducing device to which the method of the invention is applied.

Further, since reproducing is performed on the basis of the difference in photoelectric effect or thermoelectric effect, that is, on the basis of the amount of electrons emitted from the recording medium, the problem of noise which has occurred frequently upon converting physical signals in the conventional method can be overcome or reduced.

In addition, selecting a material whose work function can reversibly vary makes it possible to repeatedly perform the recording-reproducing process in a simplified manner without deterioration of the recording medium.

It should be noted that when a device laminated with a conductive layer capable of directly detecting a photoelectron or thermoelectron as electric current from aforesaid recording medium is used in the method of the invention reproducing can be performed in a more simplified manner without using a separate detector such as a photomultiplier or the like.

Therefore, the present invention provides a device for recording and reproducing information comprising a recording layer consisting of a recording medium made of the aforesaid material, the recording layer being laminated with a detecting layer for detecting an electron emitted from the recording medium.

BRIEF DESCRIPTION OF THE DRAWINGS

FIGS. 1(a) through 13(b) illustrate an embodiment of the invention.

FIG. 1(a) is an explanatory view showing a reproducing principle.

FIGS. 2 through 4 are explanatory views showing recording principles, respectively.

FIGS. 5 through 8 are explanatory views showing reproducing principles, respectively.

FIGS. 9 through 12 are sectional views illustrating respectively devices for recording and reproducing information.

FIG. 13(a) is an explanatory view showing a state of the device shown in FIG. 12 when the device is subjected to a laser beam.

FIG. 13(b) is a graph showing a variation of detected current and corresponding bits in relation to FIG. 13(a).

DETAILED DESCRIPTION OF THE PREFERRED EMBODIMENTS

Figure 1A:
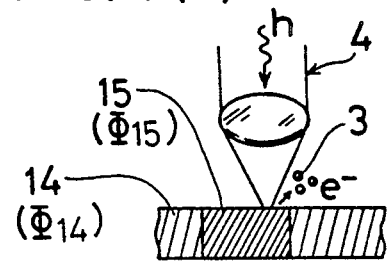

The recording medium used in the invention consists of a material whose structure can be changed by irradiation of an electromagnetic wave such as a visible radiation, an ultraviolet ray, an infrared ray, an X-ray or the like, or of an electron beam so that the work function thereof varies. The structural change in this case means a microscopic change in phase structure without substantially changing the composition, and includes, for example, a change of crystalline structure, a generation of a defective portion, and the like.

Such a material adaptable to be used for the recording medium includes an alloy made of more than two kinds of metals (B, C, N, P, or S may be included) selected from, for example, Li, Be, Al, Si, Ti, V, Cr, Mn, Fe, Co, Ni, Cu, Zn, Y, Nb, Mo, Te, Pd, Ag, Ta, W, Ir, Pt, Au, Hg, Tb, Dy, Ho, or Th; a ceramic made of $Fe_2O_3$, TiO, $ThO_2$, $MoSi_2$, $SnO_2$, $ZrO_2$, $LiTaO_3$, $Y_3Al_5O_8$, $Y_3Fe_5O_{12}$, $BaTiO_3$, $KTaO_3$, $LiNbO_3$, $Ba_2NaNb_5O_{15}$, $Bi_{12}GeO_{20}$, or the like; and a semiconductor made of Si, Ge, AlP, GaP, GaAs, InP, ZnSe, or the like.

Among them, it is preferable to use a material whose structure can reversibly change. An example of such a material is a Te alloy or an In alloy in which crystal-amorphous phase change can occur reversibly. A preferable example of the Te alloy is that made of Te and one or more materials selected from Se, Sb, As, Ge, Bi, and In. Such Te alloys include TeSe, TeSb, TeSbAs, TeGeSb, TeGeAs, TeSbIn, TeBi, or the like. On the other hand, preferable In alloys, which are made of In and one or more materials selected from Se, Sb, Tl, and Co, include InSe, InSeTlCo, or the like.

The aforesaid materials usable for the recording medium may be prepared by a known method such as a melt growth, sintering, sputtering or chemical vapor deposition method.

According to the invention, recording, reproducing, and erasing information can be performed by irradiation of the aforesaid electromagnetic wave or electron beam. This irradiation can be effected in an atmospheric air or a specific gas such as $N_2$, $O_2$, $H_2$, He, Ne, Ar, Kr, HCl, HF, $SiH_4$, $AlCl_3$, or the like, or in a vacuum. Each of the recording, reproducing, and erasing processes may be performed in a different atmosphere.

In the present invention, reproduction of recorded information is performed by utilizing a photoelectric or thermoelectric effect. In the case where the photoelectric effect is utilized, reproduction can be performed by detecting directly as electric current the electrons generated by irradiating a predetermined energy beam onto the recording medium, or by detecting the electrons emitted to the exterior with a suitable detector such as an electrode and current amplifier or an electron detector. In the case where the thermoelectric effect is utilized, the thermoelectrons generated by heat caused by irradiation of the energy beam is are detected in the same manner as described above so that the reproduction can be performed.

The preferred embodiments of the invention will now be described with reference to FIG. 1 through FIG. 13.

Figure 2:
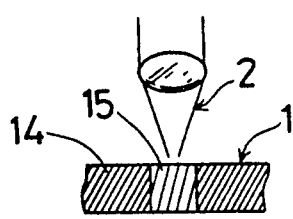

First, a recording method according to the method for recording and reproducing information of the invention is to be described.

shown in FIG. 2, as an energy means 2 such as a laser beam is used for causing work function variation. A Te alloy of TeSe, TeSb, TeSbAs, TeGeSb or the like, or an In alloy of InSe, InSeTlCo or the like is used as a recording medium 1. In this case, recording is performed by forming a local amorphous state portion as a work function varied portion 15 in contrast with a crystalline state portion having a non-varied work function as a non-varied work function portion 14. That is, recording is performed on the basis of a distribution pattern of the work function varied portion 15 caused by work function variation in accordance with a phase change of the recording medium 1.

Figure 3:
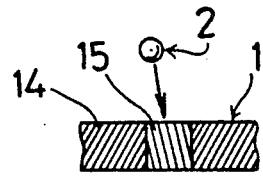

In a recording method as shown in FIG. 3, an electron beam is used as the energy means 2 for causing work function variation. In this method, the recording medium 1 is composed of a material having a periodic structure portion or a crystalline state portion being the work function non-varied portion 14 and having a homogeneous work function. In the recording medium 1, the aforesaid electron beam locally forms a multiple-defect introduced portion or an amorphous state portion being the work function varied portion 15. That is, a local structural change in the recording medium 1 brought about by the electron beam causes a local work function variation or together therewith a variation of an energy state density distribution so that recording of information can be performed. It is desirable to set an accelerating energy range of the electron beam from several-hundred eV to several-dozen KeV from the view point of recording speed or recording density.

Figure 4:
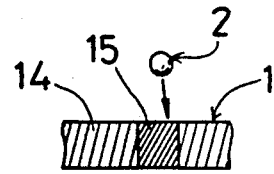

Further, in a recording method shown in FIG. 4, an electron beam is used as the energy means 2 for causing work function variation. In this method, a material having an amorphous state portion or a short-term periodic structure portion which functions as the work function non-varied portion 14 having a homogeneous work function is used as the recording medium 1. Such a recording medium 1 is subjected to the irradiation of the aforesaid electron beam to be locally heated. Then by gradually lowering the electron beam energy, the recording medium is annealed to form a crystalline structure portion or a regular structure portion functioning as the work function varied portion 15. That is, information recording is performed in an almost reversed manner of the methods described with reference to FIGS. 2 and 3. Note that in such a method the laser beam may be used instead of using the electron beam.

By combining the recording methods mentioned above with each other, the phase change or structural change between the work function non-varied portion 14 and the work function varied portion 15 can be caused reversibly and repeatedly so that recording again and erasing information can be performed on the recording medium 1.

In the recording methods above described, it may be possible to optimize the recording condition by monitoring the amount of electrons emitted from the portion where recording is performed, an energy distribution, or a state of infrared ray generation caused by heat, to detect a state change of the recording medium.

Figure 1B:
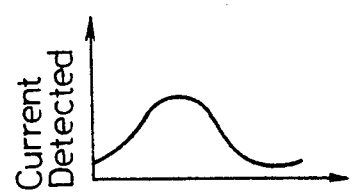
FIG. 1(b) is a graph showing a variation of detected current in relation to FIG. 1(a).

To be described next are reproducing methods. As shown in FIG. 1 (a), a laser beam as an energy means 4 for causing electrons 3 to be emitted is converged onto the recording medium 1. The difference in amount of electrons 3 emitted between from the work function non-varied portion 14 and from the work function varied portion 15 is detected as intensity variation of electric current representing a distribution pattern of the work function varied portion 15, whereby information is reproduced. As the energy means, besides the aforesaid laser beam, any other electromagnetic wave including an X ray, an ultraviolet ray or the like, a charged particle beam including an electron beam, an ion beam or the like, or a neutral particle beam may be used. In the case where a particle beam is used, it is desirable to select a particle having a low reactivity, for example, a particle of an inert element or the like in order to minimize influence on the recording medium 1.

Here, assumed that a work function at the work function non-varied portion 14 is $\Phi_{14}$ and at the work function varied portion, $\Phi_{15}$. Generally, applying light (energy) of $h\nu > \Phi$ (h: Planck's constant, $\nu$: frequency) to the surface of a material of work function $\Phi$ causes electrons having been given energy from the surface of the material to be emitted to exterior. Also, it is known that a slight current is generated because of a tunnel effect even in the case of $h\nu < \Phi$. Accordingly, when the recording medium 1 is scanned by reference light $\nu_R$ of $\Phi_{14}=h\nu_{14}<h\nu_R<\Phi_{15}=h\nu_{15}$, it becomes $\Phi_{14}<h\nu_R$ at the work function non-varied portion 14 so that electrons are emitted, whereas it becomes $h\nu_R<\Phi_{15}$ at the work function varied portion 15 so that electrons are rarely emitted. Detecting the electrons 3 emitted at this moment and difference in current intensity of the electrons makes it possible to read information from the recording medium 1.

In the case where the light does not meet to the aforesaid requirements, another light $\nu_{R1}$ of $\Phi_{14}<\Phi_{15}<h\nu_{R1}$, or reference light $\nu_{R2}$ of $\Phi_{14}>\Phi_{15}>h\nu_{R2}$ may be used. In this case, the electrons 3 are emitted from both the work function non-varied portion 14 and the work function varied portion 15. However, since there is a difference in amount of the emitted electrons 3 between the two portions, a distribution pattern of the work function varied portion can be detected on the basis of this difference so that information can be reproduced.

In the case where a material having a good conductivity like a metal is used for the electron emitting source (recording medium), the amount of emitted electrons 3 is dominated mainly by work function, whereas, in the case where a material like a semiconductor having an electron band gap is used as a recording medium, a local density of states thereof also affects the amount of emitted electrons. In this case, it is possible to reproduce information on the basis of an energy distribution of the emitted electrons.

Figure 5:
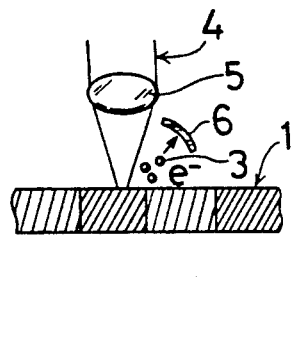
Figure 6:
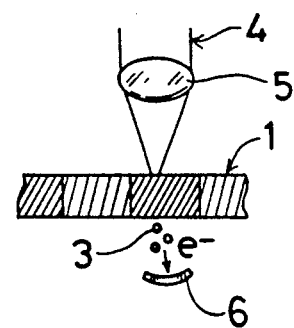

FIGS. 5 and 6 illustrate embodiments in which an electromagnetic wave such as a laser beam or the like is used as the energy means 4 for reproducing information. The laser beam is converged onto the recording medium 1 by means of an object lens (another optical means such as a diffraction grating, a mirror or the like may be used.) so that the electrons 3 are emitted from a portion to which energy is concentrated. Among the electrons 3 when the electrons emitted from the upper surface of the recording medium 1 are to be detected, a detector 6 is disposed above the recording medium 1, in contrast therewith, when the electrons emitted from the lower surface of the recording medium are to be detected, the detector 6 is disposed below. Here, on the assumption that reproduction is performed in an atmospheric air, it is desirable to dispose the detector 6 within 10 μm close to a readout portion of the recording medium 1. Also, in order to assure a high efficiency of detection, voltage is desirably being applied to keep the potential at the detector positive relative to the recording medium 1. Especially, in the case where a material of good conductivity is used for the recording medium 1, if the potential at the detector 6 is maintained in the range from about +10 mV to about +50 V, a good result can be obtained with respect to noise or intensity of a regenerative signal. When reproduction is performed in any other atmosphere or in a vacuum, or when a material of poor conductivity is used for the recording medium 1, the efficiency of detection can also be improved by setting conditions according to each situation.

In the reproducing method shown in FIG. 6, since the electrons 3 are detected below the side to which the laser is applied, a thickness of the recording medium 1 also affects the efficiency of detection. In this case, the preferable thickness of the recording medium 1, which depends on the material to be used therefor, is generally same as or below the depth to which the laser beam reaches. That is, the thicker the thickness of the recording medium grows, the more it is difficult for the laser beam to reach the lower surface of the recording medium 1, resulting in decrease in exponential grade of a quantity of light. On the other hand, when the thickness decreases too much, most of the laser transmits through the medium without exciting electron, also the electron emitting area grows smaller so that the amount of electrons 3 to be detected decreases.

On such a case, disposing the detector 6 in both sides of the recording medium to detect electrons 3 emitted upwardly and downwardly enables the efficiency of detection to be more improved.

Figure 7:
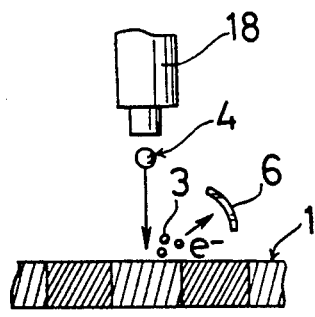
Figure 8:
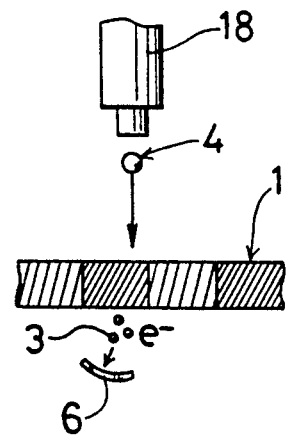

In FIGS. 7 and 8, a charged particle beam such as an electron beam, an ion beam or the like is used as the energy means 4 for irradiating onto the recording medium instead of using a laser beam in order to emit the electrons 3. In this case, the incident energy of the charged particle beam can be considered to be the energy $h\nu$ of the laser beam as aforementioned. In an atmospheric air or a specific gas, an effective distance of the charged particle beam depends greatly on an average free path in each atmosphere. Thus, the distance from a charged particle beam source 18 to the recording medium 1 is preferably determined by referring to the aforesaid average free path. For example, when reproduction is performed in an atmospheric air by using the electron beam, it is desirable to set the aforesaid distance between the beam source 18 and the recording medium 1 from 0.001 µm to 1 µm, and beam accelerating voltage approximately 1 V to 500 V. When the electron beam is used, voltage is applied to keep the potential at the recording medium 1 positive relative to that at the beam source 18, whereas when the particle beam having positive charge is used, negative potential is to be kept at the recording medium 1. In the aforesaid cases, as is the case of the reproducing method using the laser beam, the emitted electrons 3 can be detected by the detector 6 disposed above the upper surface or below the lower surface of the recording medium 1, or disposed in the both sides. Also, like the reproducing method using the laser beam, the same condition setting such as keeping positive potential at the recording medium 1, the position of the detector 6, the applied voltage, or the like is required.

In the embodiment shown in FIG. 7, when the negatively charged particle beam such as the electron beam or the like is used, since the detector 6 and the beam source 18 are located on the same side relative to the recording medium 1, moreover since positive potential is kept at both the detector 6 and the recording medium 1 relative to the beam source 18, a part of the particle beam cannot be converged normally on the surface of the recording medium 1 by influence of an electric field caused by the detector 6, also the particle beam may enter the detector 6 to generate noise. Therefore, in such a case, it is desirable that potential at the recording medium 1 be kept from +1 V to +100 V relative to the beam source 18, while the applied voltage to the detector 6 is set 0.01 V to 10 V, that is 1/10 to 1/100 of the applied voltage to the recording medium 1, so that the difference in applied voltage between the recording medium 1 and the detector 6 can be provided.

In the embodiments described above with reference to FIGS. 5 through 8, it is possible to apply the light beam or particle beam as the energy means 4 with a predetermined incident angle relative to the surface of the recording medium 1. However, since smaller diameter of the converged spot of the beam allows improvement in recording density, it is desirable to apply the beam perpendicularly to the surface of the recording medium 1. Also, the laser beam having a long wave length or the particle beam having lower energy being applied to heat the recording medium 1 to the extent that structure thereof will not be changed, reproducing information can be performed on the same principle as above by detecting the electrons 3 emitted from the recording medium 1 by thermal excitation in order to read the work function variation.

To be described next are recording media to be used in the methods for recording and reproducing information described above. As shown in FIG. 9, the recording media 10 comprises, for example, the recording layer 1 for recording information and a detecting layer consisting of Al, Au, Pt, or the like for detecting the regenerative signals when reproducing the recorded information. With this, the regenerative signals can be detected directly from the recording layer 1 without necessitating a separate detector provided outside of the media 10. By providing the recording medium 10 of such a construction in the form of a disc, tape, or card, it becomes possible to make use of a conventional reproducing apparatus of optical disc. Also, by providing a protective layer covering overall surface of the device to protect from deterioration of the recording media 10 and from affection of a gaseous substance in an atmosphere, preservation and handling of the recording device 10 become simplified.

In a recording medium 11 shown in FIG. 10, an intermediate layer 8 consisting of an insulating layer of $SiO_2$, SiN, $Al_2O_3$, AlN or the like is formed between the recording layer 1 and the detecting layer 7 in order to protect from performance deterioration of the recording layer 1 caused by diffusion of the elements constituting the detecting layer 7 into the recording layer 1 and reversed phenomenon thereof. In this case, when aforesaid reproducing methods shown in FIGS. 6 and 8 are performed, that is, when the detector 6 is provided behind the side to which the beam is applied, it is preferable to set the thickness of the recording medium 0.001 µm to 5 µm, that of the intermediate layer 8 (insulating layer) 0.001 µm to 0.1 µm, and that of the detecting layer more than 0.1 µm. As well, lead electrodes 19,19 are mounted to the recording medium 1 and the detecting layer 7 so that voltage can be applied respectively to enhance the convergent performance of the beam, whereby improvement can be made in detection efficiency. In contrast, when reproducing methods shown in FIG. 5 and 7 are performed, since the beam is required to transmit through the detecting layer 7 and the intermediate layer 8 to reach the recording layer 1, it is desirable that the thickness of the detecting layer 7 be below 0.1 µm, and that of the intermediate layer 8 approximately 0.001 µm to 0.01 µm.

A recording medium 11 shown in FIG. 12 comprises the detecting layers 7,7 and the intermediate layers 8,8 on both sides of the recording layer 1 in order to improve detection efficiency thereof. In this case, it is desirable to apply the thickness conditions of the layers described with reference to FIG. 10 to the detecting layers 7,7 and the intermediate layers 8,8, respectively.

With reference to FIGS. 10 and 11, when recording is performed on the basis of work function variation by generating a structure change by means of the beam heat, it is desirable to use an oxide or nitride, for example, Si—O, Si—N, or Al—O, Al—N, not giving a bad influence on the recording layer 1 or the detecting layers 7,7 by causing thermal diffusion or the like in the intermediate layers 8,8.

FIG. 12 illustrates a recording medium 13 provided in a form of disc, tape, or card for recording and reproducing information by means of a laser beam, an X ray, an ultra violet ray, or the like. The recording medium 13 provided with a protective layer 20 made of an acrylate UV setting resin, silicone coating material, unsaturated polyester resin, or the like for protecting against flaw and dust caused from exterior, being formed as the first layer to the beam. Subsequently provided are the recording medium 1, the intermediate layer 8, the detecting layer 7 sequentially, and at the bottom, a glass substrate 21 serving as both a substrate and a protecting layer. When the beam to be used can transmit through the glass substrate 21 like an electromagnetic wave such as light or the like, it is possible to reproduce information by applying the beam incident from the side of the glass substrate 21.

FIG. 13(a) shows the case where recording, reproducing, or erasing information is performed by using the recording medium 13. When the recording medium 13 is in a form of a disc to record or reproduce information, a row of aforesaid work function non-varied portion 14 and work function varied portion 15 is formed in concentric or spiral shape to be detected, by moving or rotating either of the energy means 2,4 or the recording medium 13, or both of them. When erasing, work function non-varied portion is to be formed. In the case where the recording medium 13 is in a shape of tape or card by moving either of the energy means 2,4 or the recording medium 13, or both of them, a row of the work function non-varied portion 14 and the work function varied portion 15 is lineally formed (recording), and then detected (reproducing). To erase the record, the work function non-varied portion is to be formed (erasing) in a straight line. In this case, output of the energy means 2 is modulated on the basis of a pattern according to information to be recorded when recording. In contrast, when reproducing, current intensity variation according to a distribution pattern of aforesaid work function non-varied portion 14 and the work function varied portion 15 is detected by the detecting layer 7. Then the current intensity variation having been detected is subjected to a binary-coded sampling using an appropriate threshold value, whereby data represented by 1 and 0 can be obtained.

EXAMPLE

The recording device 13 of the invention as shown in FIG. 12 was obtained by laminating on the glass substrate 21 an Au film (the detecting layer 7) of approximately 100 nm thick, a SiO$_2$ film (the intermediate layer 8) of approximately 30 nm thick, an InSbTe film (the recording medium 1) of approximately 50 nm thick, and a SiO$_2$ film (the protective layer 20) in this order by sputtering method.

Recording was performed by applying the laser beam produced by a semiconductor laser means of 830 nm wave length, approximately 40 mW of maximum power, from the side of the protective layer 20. A laser beam of 15 mW (flux: 1.0 μm) is applied onto the crystallized InSbTe film 1 to be rendered partially amorphous for recording information. It was confirmed that this amorphous portion was recrystallized reversibly by applying a laser beam of 10 mW.

Thus, recording information was performed on the basis of a distribution pattern of the amorphous and crystallized portion, followed by grounding of the detecting layer 7, then applying voltage of +5 V to the recording medium from exterior. In keeping this state, an Ar laser beam was converged (flux: 1.0 μm) by means of a lens, then irradiated from the protective layer 20 side to the InSbTe film 1 under scanning, whereby a slight current intensity variation corresponding to aforesaid distribution pattern shown in FIG. 13(b) could be detected.

What is claimed is:

1. A method of recording and reproducing information comprising the steps of:
    a) providing a recording medium;
    b) impinging energy directly on the recording medium to apply heat directly thereto in order to change a structure of the recording medium so as to vary a work function of the recording medium to form a distribution pattern on a work function varied portion of the recording medium to record information; and
    c) detecting the distribution pattern formed on the work function varied portion of the recording medium by detecting a difference in effect of the work function varied portion of the recording medium and a remainder of the recording medium, and reproducing the recorded information from the difference.

2. The method of claim 1 wherein the recording medium includes a material capable of reversible crystal-amorphous phase change.

3. The method of claim 1 wherein the recording medium includes a Te alloy such as TeSe, TeSb, TeSbAs, TeGeSb, TeGeAs, TeSbIn or TeBi.

4. The method of claim 1 wherein the recording medium includes an In alloy such as InSe or InSeTlCo.

5. The method of claim 1 wherein the energy includes an electron beam with an accelerating voltage in the range of 1 to 500 V.

6. The method of claim 1 wherein the energy is an electromagnetic wave such as a laser beam.

7. The method of claim 1 wherein the recording medium is maintained at a positive potential by applying a voltage thereto.

8. The method of claim 1 wherein the distribution pattern is a row of a concentric, spiral or linear shape in the recording medium.

9. A recording/reproducing medium for use in a recording/reproducing device comprising:
    recording layer means whose microstructure is altered by impinging energy directly thereon in order to vary a work function of portions of said recording medium; and
    detecting layer means, laminated on said recording layer means, for detecting electrons emitted from said recording layer as a result of the impinging energy, wherein the lamination of said recording layer means and said detecting layer means minimizes variations in distance between said layers and maximizes accuracy of the number of electrons detected by said detecting layer means.

10. The medium of claim 9 wherein said detecting layer means includes an electroconductive material such as Al, Au or Pt.

11. The medium of claim 9 further comprising an insulating layer between said recording layer means and said detecting layer means.

12. The medium of claim 11, wherein the insulating layer includes SiO$_2$, SiN, Al$_2$O$_3$, or AlN.

13. In combination a recording medium and recording/reproducing system therefore, comprising:
    the recording medium, including a recording layer, whose microstructure is altered by impinging energy directly thereon in order to vary a work function of portions of the recording layer; and
    the recording/reproducing system including:
        impinging energy means for generating the impinging energy, and
        detector means, laminated on said recording layer for detecting electrons emitted from said recording layer as a result of the impinging energy, wherein the lamination of said recording layer and said detector means minimizes distance variations in between and maximizes accuracy of the number of electrons detected by said detector means.

14. In combination a recording medium and a method for recording and reproducing information from the recording medium comprising:
    the recording medium, including a recording layer, whose microstructure is altered by impinging energy thereon in order to vary a work function of portions of the recording layer;
    said method comprising the steps of:

a) impinging energy directly on the recording medium to apply heat directly thereto in order to change a structure of the recording medium so as to vary a work function of the recording medium to form a distribution pattern on a work function varied portion of the recording medium to record information; and b) detecting the distribution pattern formed on the work function varied portion of the recording medium by detecting a difference in effect of the work function varied portion of the recording medium and a remainder of the recording medium, and reproducing the recorded information from the difference.

* * * * *